United States Patent
Cho et al.

(10) Patent No.: US 6,768,890 B2
(45) Date of Patent: Jul. 27, 2004

(54) COUPLING APPARATUS, DEVELOPMENT CARTRIDGE AND ELECTROPHOTOGRAPHIC PRINTER HAVING THE SAME

(75) Inventors: Mun-son Cho, Suwon (KR); Kyung-hwan Jang, Seoul (KR); Douk-soo Cha, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/164,383

(22) Filed: Jun. 10, 2002

(65) Prior Publication Data

US 2003/0053823 A1 Mar. 20, 2003

(30) Foreign Application Priority Data

Sep. 18, 2001 (KR) ........................................ 2001-57653

(51) Int. Cl.[7] .............................................. G03G 15/00
(52) U.S. Cl. ........................................ 399/167; 399/120
(58) Field of Search ..................... 222/DIG. 1; 399/111, 399/116, 117, 119, 120, 167, 262, 263

(56) References Cited

U.S. PATENT DOCUMENTS 5,926,673 A * 7/1999 Foster et al. ................. 399/167
6,032,013 A * 2/2000 Niizawa ....................... 399/262
6,173,146 B1 * 1/2001 Wang et al. ................. 399/265

* cited by examiner

*Primary Examiner*—Hoang Ngo
(74) *Attorney, Agent, or Firm*—Staas & Halsey LLP

(57) ABSTRACT

A coupling apparatus to transfer a rotation force in a connected state. The apparatus has a first coupler having a first sloping rib formed at one end thereof and sloped in a rotation direction, and a second coupler having a second sloping rib formed at an inner circumference of the second coupler and sloped to correspond to the first sloping rib. The sloping ribs are connected by being pressed as the first coupler and the second coupler are relatively rotated, and rotation axes of the couplers coincide when the sloping ribs are completely connected.

23 Claims, 7 Drawing Sheets

COUPLING APPARATUS, DEVELOPMENT CARTRIDGE AND ELECTROPHOTOGRAPHIC PRINTER HAVING THE SAME

CROSS-REFERENCE TO RELATED APPLICATIONS

This application claims the benefit of Korean Application No. 2001-57653, filed Sep. 18, 2001, in the Korean Industrial Property Office, the disclosure of which is incorporated herein by reference.

BACKGROUND OF THE INVENTION

1. Field of the Invention

The present invention relates to a coupling apparatus to transfer power, and a development cartridge and an electrophotographic printer having the coupling apparatus.

2. Description of the Related Art

Generally, an electrophotographic printer such as a laser printer or a copy machine has a development cartridge for forming an image. The development cartridge has a built-in toner cartridge for supplying toner, which is a development agent, and a rotatable photosensitive drum. The photosensitive drum forms an electrostatic latent image corresponding to a desired image by a light projected from a laser projection unit. In addition, a predetermined image is formed as toner supplied by toner supply means is clung to the formed electrostatic latent image. The toner image formed on the photosensitive drum is transferred to a paper passing through the photosensitive drum and a fixing roller and is printed.

The development cartridge is a disposable article that should be changed when the toner, which is filled inside, is consumed. Therefore, the development cartridge is removably connected with a printer body. Power can be transferred to the development cartridge from a predetermined driving unit of the printer body through a coupling apparatus when the development cartridge is installed in the printer body. In other words, the coupling apparatus for driving the photosensitive drum and a roller for supplying the toner are provided. One example of the conventional coupling apparatus is shown in FIG. 1.

Referring to FIG. 1, the coupling apparatus has a slave coupler 2 disposed at one end of the photosensitive drum 1 of the development cartridge. The coupling apparatus also has a driving coupler 3 disposed in a direction of the driving unit for transferring the driving power to the slave coupler 2. The slave coupler 2 has bar-type ribs 2a that protrude at a predetermined interval of an inner circumference of a cylinder of the slave coupler. Moreover, the driving coupler 3 has bar-type ribs 3a that protrude at a predetermined interval at an outer circumference of a cylinder of the driving coupler 3. Accordingly, when the driving coupler 3 is inserted into the slave coupler 2, the ribs 3a are placed between each of the ribs 2a. When the driving coupler 3 is rotated, the ribs 3a and 2a contact each other, and the driving power of the driving coupler 3 is transferred to the slave coupler 2, thereby driving the development cartridge.

However, the above coupling apparatus has a gap between the slave coupler 2 and the driving coupler 3 due to errors generated during manufacturing and assembly. Specifically, the gap is generated between an inner diameter of the slave coupler 2 and an outer diameter of the driving coupler 3. Rotation centers of the couplers 2 and 3 might differ because of the gap. When the couplers 2 and 3 are rotated about different rotation centers, a rotation speed and a rotation force generated from the driving unit are not transferred exactly to the development cartridge. In this case, an accuracy of the image printed on the paper deteriorates as the rotation speed and the rotation force of the photosensitive drum vary.

SUMMARY OF THE INVENTION

Accordingly, it is an object of the present invention to provide a coupling apparatus having an improved structure to transmit a rotation power exactly, and a development cartridge, and an electrophotographic printer employing the coupling apparatus.

Additional objects and advantages of the invention will be set forth in part in the description which follows and, in part, will be obvious from the description, or may be learned by practice of the invention.

The foregoing and other objects of the present invention are achieved by providing a coupling apparatus including a first coupler having a first sloping rib formed at one end, being sloped in a rotation direction, and a second coupler having at least one second sloping rib formed at an inner circumference being sloped corresponding to the first sloping rib. Each sloping rib is relatively connected by being pressed as the first coupler and the second coupler are relatively rotated, and each coupler can be rotated together when each sloping rib is completely connected.

The foregoing and other objects of the present invention are also achieved by providing a development cartridge removably disposed at a printer main body of an electrophotographic printer including a driving motor and a first coupler to transfer a rotation force of the driving motor. The first coupler includes a tapered portion having an outer diameter gradually increasing from one end portion and a first sloping rib being sloped at an outer circumference of the tapered portion. The development cartridge includes a photosensitive drum rotatably disposed at a cartridge frame, and a second coupler disposed at one end of the photosensitive drum, and has an inner diameter that gradually reduces from an outside to an inside corresponding to the tapered portion and a second sloping rib corresponding to the first sloping rib. The first coupler is inserted into the second coupler as the first coupler is rotated, and a rotation force of the driving motor is transferred to the first coupler and the second coupler as the driving motor is rotated.

The foregoing and other objects of the present invention are also achieved by providing an electrophotographic printer including a main body and a development cartridge removably disposed at the main body. The electrophotographic printer further includes a driving motor, a rotation unit rotated by a rotation force transferred from the driving motor, a first coupler movably supported at the rotation unit and having a spiral type first sloping rib at one end, and a removable unit to connect and separate the development cartridge with and from the main body.

The development cartridge includes, a photosensitive drum, a development unit to develop the image on the photosensitive drum, and a second coupler having a second sloping rib for being coupled with the first sloping rib by being spirally formed at an inner circumference corresponding to the first sloping rib and being rotated. The rotation force of the driving motor is transferred from the rotation unit to the photosensitive drum according to a connection by a relative rotation of the first sloping rib and the second sloping rib.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
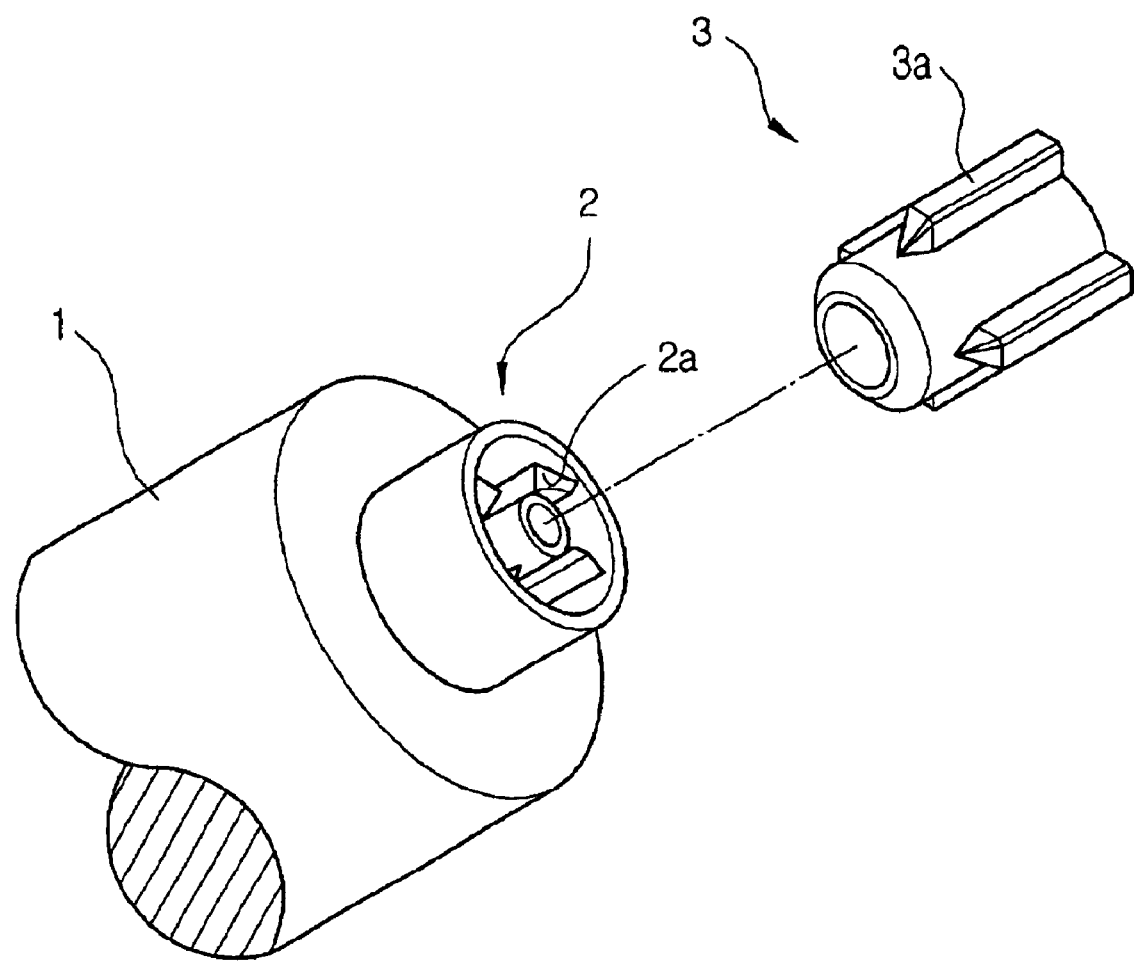
FIG. 1 is a schematic perspective view showing a conventional coupling apparatus.

Reference will now be made in detail to the present preferred embodiments of the present invention, examples of which are illustrated in the accompanying drawings, wherein like reference numerals refer to like elements throughout.

Figure 2:
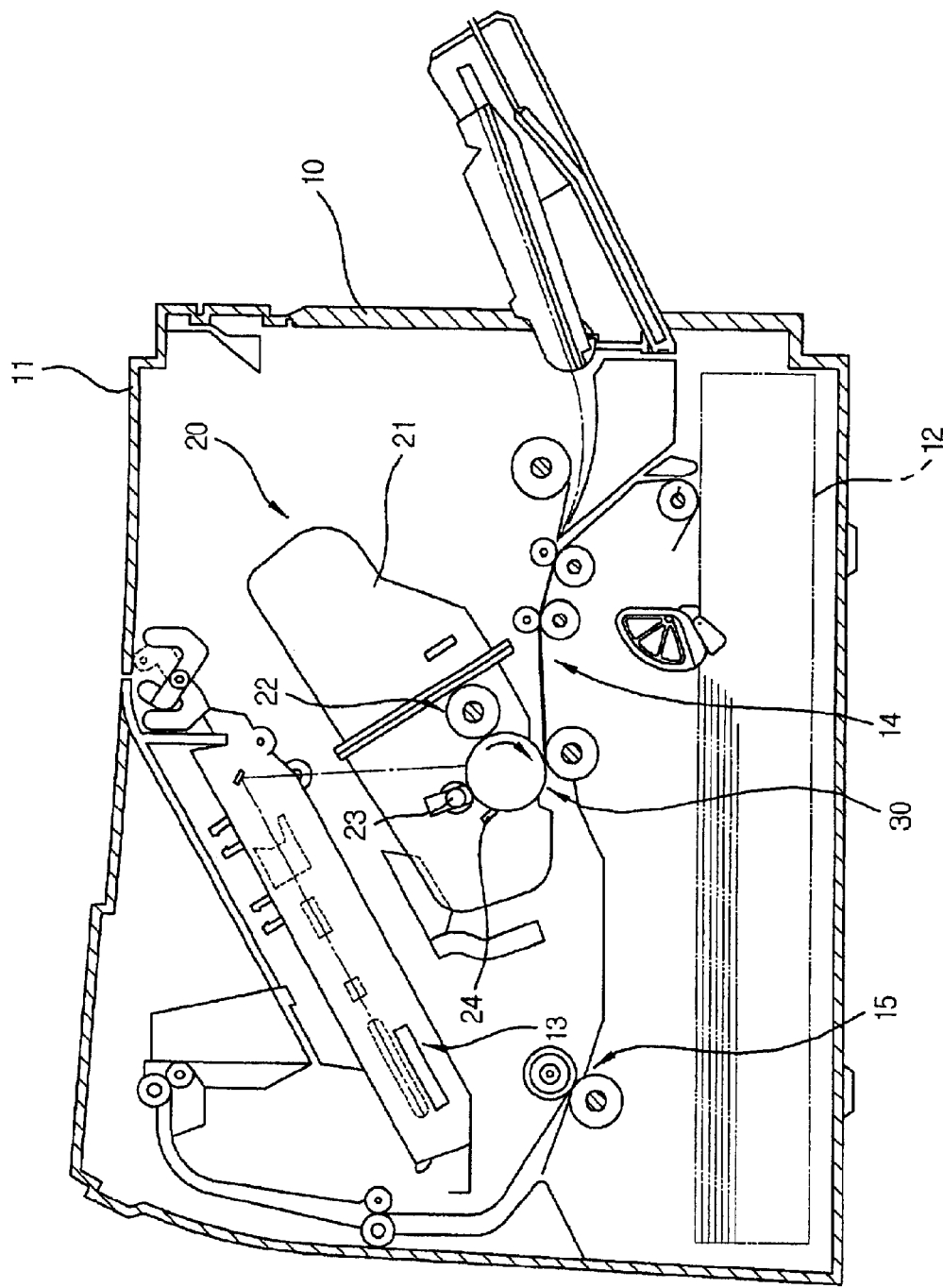
FIG. 2 is a schematic side view showing an electrophotographic printer having a coupling apparatus and a development cartridge according to the present invention.

Referring to FIG. 2, the electrophotographic printer according to the present invention includes a main body 10 and a development cartridge 20, which is removably disposed at the main body 10. The development cartridge 20 prints an image on a printing paper.

A door 11, to open and close portions of the main body 10 to install and separate the development cartridge 20, is disposed at an upper part of the main body 10. In addition, a paper tray 12 to supply a printing medium and a laser scanning unit 13 are disposed at an inside of the main body 10. The laser scanning unit 13 scans a light according to printing information to a photosensitive drum 30 disposed at the development cartridge 20. An electrostatic latent image corresponding to a predetermined image is formed by the scanned light on a surface of the photosensitive drum 30. The image is formed by a development agent such as toner, which is clung to an electrostatic latent image area. Furthermore, a transfer unit 14 to transfer the printing paper and fixing unit 15 to fix the image to the printing paper are further installed inside of the main body 10. The transfer unit 14 and the fixing unit 15 can be any of several known designs, and therefore a detailed description will be omitted here.

The development cartridge 20 has a photosensitive medium such as a development roller 22, a charge roller 23 and a cleaning member 24. The photosensitive medium is rotatably disposed at a cartridge frame 21. The photosensitive drum 30 is rotated by power transferred by the coupling apparatus, which will be described later. The surface of the photosensitive drum 30 is charged to a predetermined electric potential by a voltage supplied from the charge roller 23. Moreover, the light scanned from the laser scanning unit 13 corresponding to the image information forms an electrostatic latent image corresponding to the predetermined image on the surface of the photosensitive drum 30. The electrostatic image is developed by the toner supplied by the charge roller 23.

A predetermined amount of toner is filled inside of the development cartridge 20. The toner is supplied to the development roller 22 by a supply unit (not shown). The development roller 22 is rotated by being connected with the photosensitive drum 30.

Figure 3:
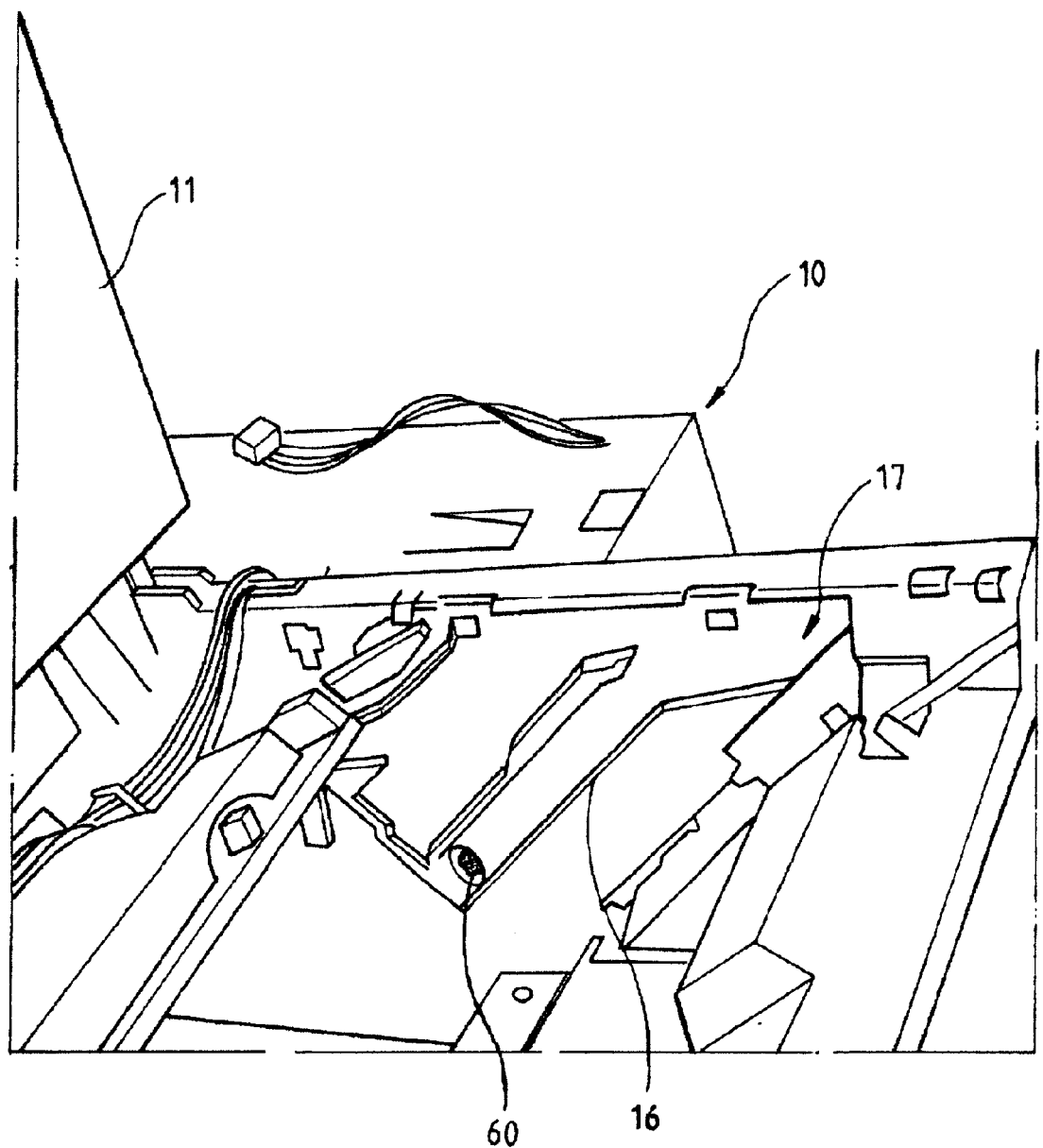
FIG. 3 is a schematic view of the main body of the electrophotographic printer of FIG. 2.

Moreover, referring to FIG. 3, a removable unit to settle and separate the development cartridge 20 is disposed at the main body 10. The removable unit includes guide members 16 to guide a movement of the development cartridge 20 when the development cartridge 20 is inserted into the main body 10, and a receptor unit 17 to receive the development cartridge 20. The receptor unit 17 has the guide members 16 disposed at both ends thereof. In other words, the guide members 16 are disposed at both sides of the inside of the receptor unit 17. The receptor unit 17 is opened and closed by the door 11.

When the door 11 is closed in a state in which the development cartridge 20 is installed at the receptor unit 17, the coupling apparatus is in an engaged state. The detailed operation of the coupling apparatus will be described later. When the development cartridge 20 is settled at the receptor unit 17, the photosensitive drum 30 and each of the rollers 22 and 23 are able to rotate as a rotation force is transmitted from the main body 10.

Figure 4:
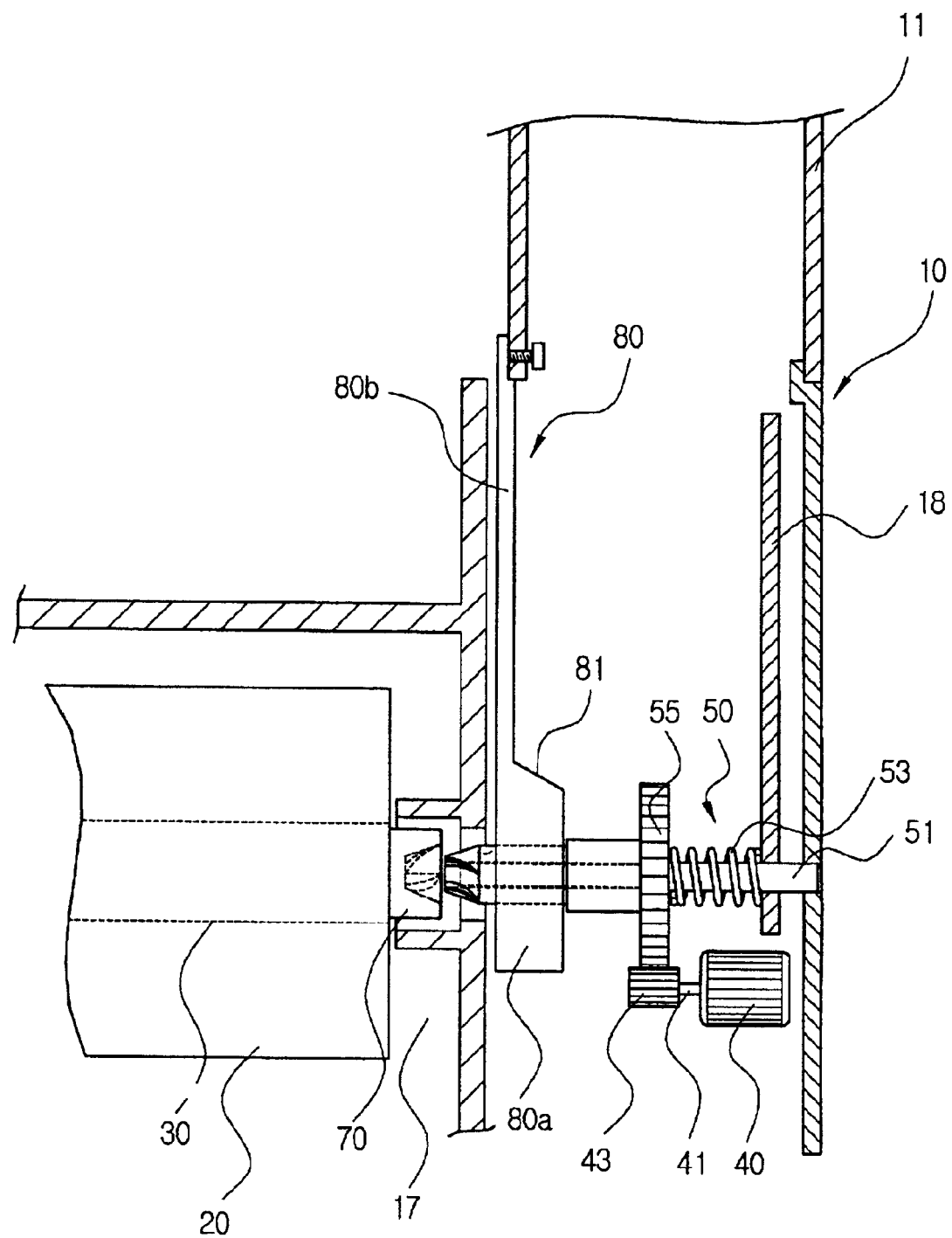
FIG. 4 is a schematic sectional view showing a portion of FIG. 2.

In addition, referring to FIG. 4, the printer according to the present invention has a driving motor 40 (installed in the main body 10), a rotation unit 50 rotated by power transmitted from the driving motor 40, and the coupling apparatus to transmit the power to the development cartridge 20 by being connected with the rotation unit 50.

The rotation unit 50 has a shaft 51 rotatably supported to a support bracket 18 disposed in the main body 10, and a driven gear 55 connected with the shaft 51. The driven gear 55 is geared with a driving gear 43 disposed at a motor shaft 41 of the driving motor 40.

Figure 5:
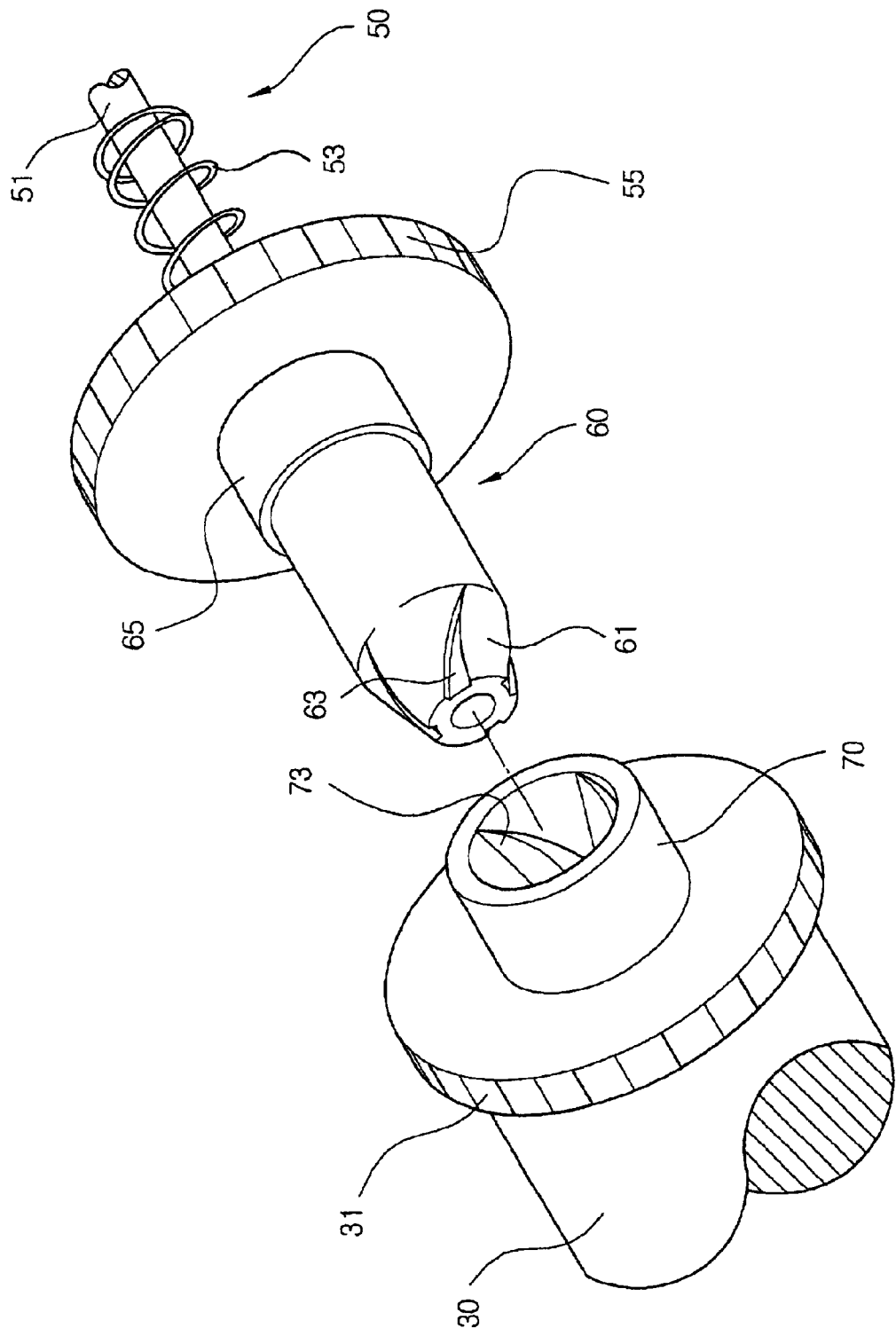
FIG. 5 is a perspective view schematically showing the coupling apparatus of FIG. 4.

The coupling apparatus comprises a first coupler 60 (see FIG. 3) disposed at the shaft 51 of the rotation unit 50, and a second coupler 70 disposed at one side of the development cartridge 20. As shown in FIG. 5, the first coupler 60 is integrally formed with the driven gear 55 and rotatably supported by the shaft 51. The first coupler 60 has a tapered portion 61 having a gradually decreased outer diameter in a direction of an end, and a flange portion 65. A plurality of spiral-type first sloping ribs 63 are formed at an outer circumference of the tapered portion 61. The first sloping ribs 63 are sloping grooves formed in a direction of the circumference at predetermined intervals. Moreover, the width of each of the sloping grooves gradually decreases in a direction of the flange portion 65. The flange portion 65 is disposed for a forward and backward movement of the first coupler 60, and has a greater outer diameter than that of the first coupler 60.

Figure 6A:
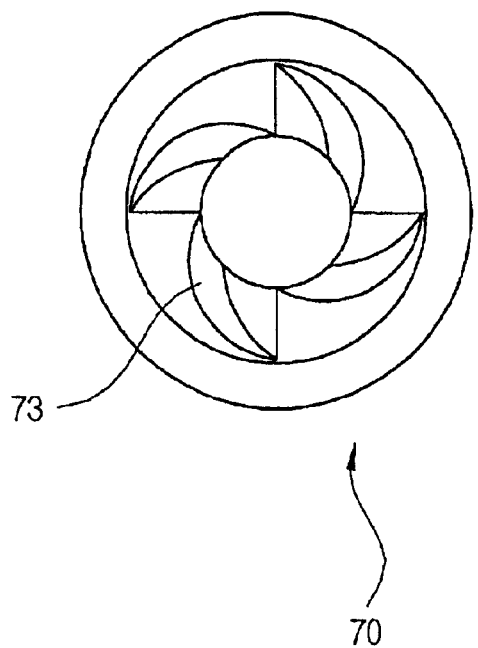
FIGS. 6A and 6B are a side view and a front view, respectively, showing a second coupler of FIG. 5.
Figure 6B:
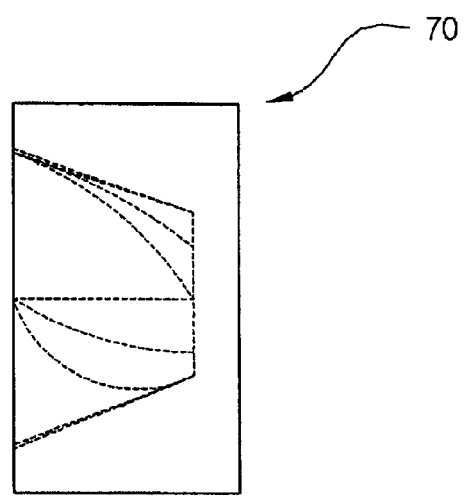

The second coupler 70 is disposed at one end of the photosensitive drum 30, and rotates with the photosensitive drum 30. Here, a connecting gear 31 to drivedly connect the development roller 22 and the charge roller 23 can be disposed at one side of the photosensitive drum 30. As shown in FIGS. 6A and 6B, the second coupler 70 has an inner diameter that gradually decreases from an outside to an inside in order to correspond to the tapered portion 61. A plurality of second sloping ribs 73 corresponding to the first sloping ribs 63 are disposed at an inner diameter of the second coupler 70. The second sloping ribs 73 are spiral protrusions spirally protruding at the inner circumference of the second coupler 70 at predetermined intervals. The spiral protrusions are formed with the same angle and the same number as the first sloping ribs 63. Moreover, a width of the spiral protrusions gradually increases from an outside to an inside. Therefore, when the tapered portion 61 of the first coupler 60 is inserted into the second coupler 70, the second sloping ribs 73 are engaged with the first sloping ribs 63.

Since the first and second sloping ribs 63, 73 have a spiral shape, the first coupler 60 and the second coupler 70 are engaged with each other by a relative rotation to connect the sloping grooves with the spiral protrusions. When separating the sloping grooves from the spiral protrusions, each of the couplers 60 and 70 should be separated by relative rotation in the opposite direction. Accordingly, a connection unit to connect the first coupler 60 with the second coupler 70, and a separation unit to separate the first coupler 60 from the second coupler 70, are further provided.

The connection unit comprises a pressing spring 53 connected with the shaft 51 of the rotation unit 50 in order to press the first coupler 60 in the direction of the development cartridge 20. In other words, the pressing spring 53 is disposed between the driven gear 55 and the support bracket 18 and presses one side of the driven gear 55.

The separation unit includes the flange portion 65 disposed at the outer circumference of the first coupler 60, an interference lever 80 disposed at the main body 10 to move upward and downward, and the door 11 drivedly connected with the interference lever 80. The interference lever 80 selectively interferes with the flange portion 65.

As described above, the flange portion 65 has a greater outer diameter than that of the first coupler 60. The interference lever 80 has a sloping side 81 which interferes with the flange portion 65 when moving. Furthermore, the width of the interference lever 80 is different at an upper part 80b and a lower part 80a of the sloping side 81. Therefore, when the interference lever 80 moves upward, the sloping side 81 interferes with the flange portion 65 and pushes away the flange portion 65 from the second coupler 70. When the interference lever 80 is completely elevated, the flange portion 65 is separated from the second coupler 70 by being in contact with the lower part 80a of the interference lever 80, and is maintained in a separated state from the second coupler 70. When the interference lever 80 moves downward, the upper part 80b of the interference lever 80 faces the flange portion 65, and the first coupler 60 is connected with the second coupler 70 by being pressed by the pressing spring 53.

Here, it has been exemplified that the interference lever 80 moves upward and downward by being drivedly connected to the opening and the closing of the door 11, but this is only an example. Although not illustrated herein, the interference lever 80 can move upward and downward by an operation lever, which is manually operated by a user. Other methods of moving the interference lever 80 upward and downward are know, and therefore, will not be described.

In a state in which the receptor unit 17 is opened by opening the door 11 (as FIG. 3), the development cartridge 20 can be installed in the receptor unit 17 (as shown in FIG. 4). In this case, the interference lever 80 is elevated with the door opened 11. The first coupler 60 is distantly placed from the development cartridge 20 as the interference lever 80 is pushed away as it contacts the lower part 80a of the interference lever 80. Accordingly, since the first coupler 60 does not interfere with the second coupler 70 when installing the development cartridge 20, the development cartridge 20 can be easily installed.

Figure 7:
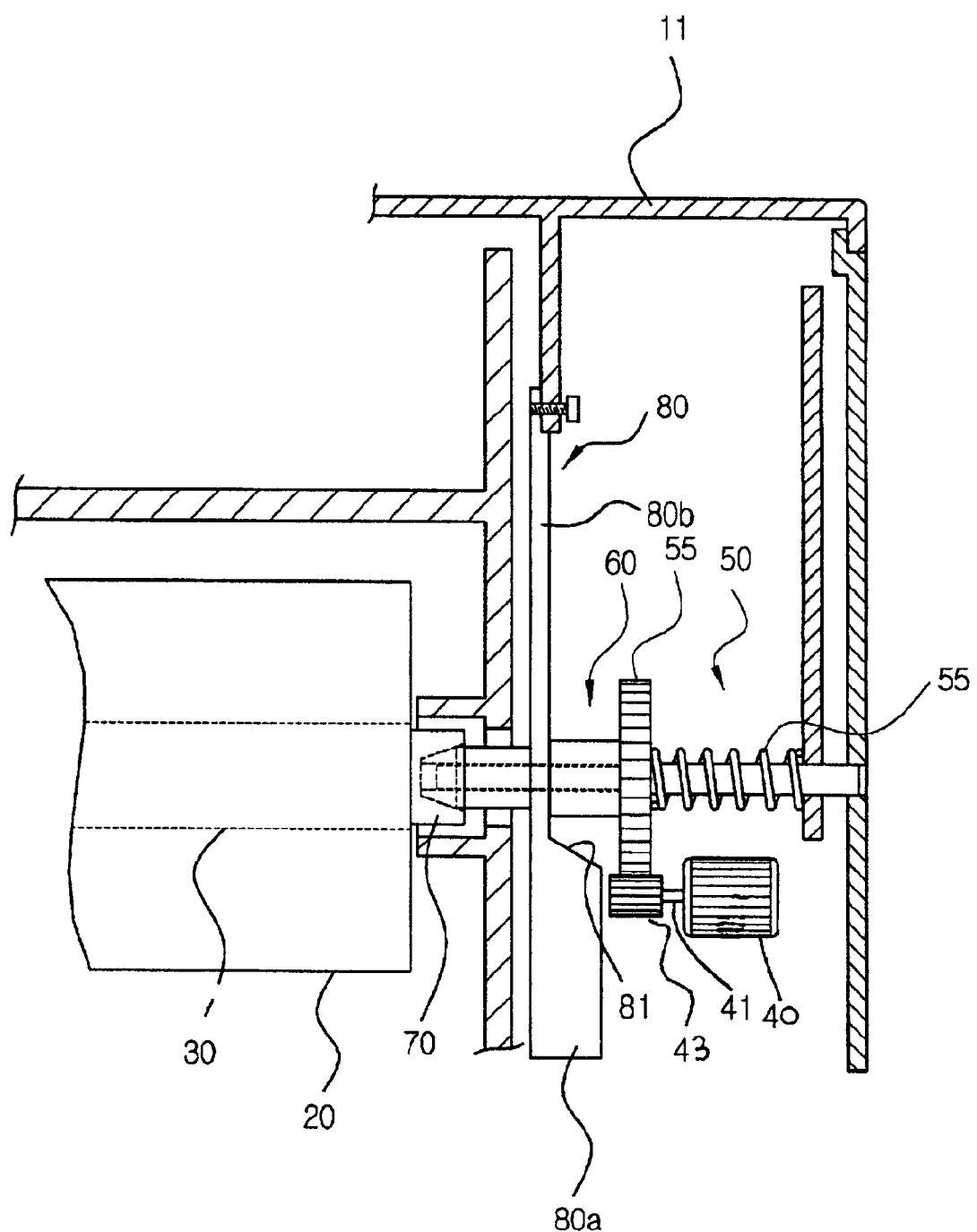
FIG. 7 is a schematic view showing the portion shown in FIG. 4, in a state in which the couplers are connected to each other as a door is opened and closed.

Next, when the door 11 is closed, the interference lever 80 moves downward (as shown in FIG. 7). Then, the first coupler 60 is made to contact the upper part 80b of the interference lever 80 by a pressing force of the pressing spring 53, and the tapered portion 61 is inserted into the inner diameter of the second coupler 70.

In this state, when the driving motor 40 is driven, the first coupler 60 is rotated as the driving gear 43 and the driven gear 55 are drivedly connected with each other. At this time, as the first coupler 60 is rotated, the first sloping ribs 63 are completely engaged with the second sloping ribs 73. Furthermore, when each of the couplers 60 and 70 are completely connected to each other, then the couplers 60 and 70 rotate together.

Since each of the couplers 60 and 70 is moved along the sloping ribs 63 and 73 about a single rotation axis, the rotation centers coincide. When the centers of rotation coincide, a rotation speed of the first coupler 60 and a rotation speed of the second coupler 70 are equal. Thus, the rotation of the photosensitive drum 30 and the development roller 22 are constant and the accuracy of the image is improved.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A coupling apparatus to transfer a rotation force, comprising:
   a first coupler comprising a first sloping rib sloped in a rotation direction of the coupling apparatus; and
   a second coupler, connectable and separable from the first coupler, comprising a second sloping rib corresponding to the first sloping rib and formed at an inner circumference of the second coupler,
   the first and second sloping ribs being connected by being pressed as the first and second couplers are rotated relative to each other, and
   the first and second couplers being rotated together about coinciding axes in a state in which the first and second ribs are completely connected.

2. The coupling apparatus according to claim 1, wherein:
   the first coupler comprises a tapered portion having an outer circumference, the outer circumference gradually decreased in a direction of an end of the first coupler, and the first sloping rib is a sloping groove spirally formed at the outer circumference of the tapered portion, and
   the second coupler comprises an inner circumference corresponding to the tapered portion and gradually decreased from an outside to an inside of the second coupler, and the second sloping rib is a spiral protrusion spirally protruding from the inner circumference of the second coupler.

3. The coupling apparatus according to claim 2, wherein:
   a width of the spiral protrusion gradually increases from the outside to the inside of the second coupler,
   a width the sloping groove is gradually decreases in a direction away from the end of the first coupler, and
   the sloping protrusion is connected with the sloping groove as the first and second couplers are relatively rotated.

4. A development cartridge removably disposed at a printer main body of an electrophotographic printer, the development cartridge to form an image on a printing medium, the electrophotographic printer comprising a driving motor and a first coupler to transfer a rotation force of the driving motor, the first coupler comprising a tapered portion having an outer circumference gradually increasing in a direction away from an end portion thereof and a first sloping rib being sloped at the outer circumference of the tapered portion, the development cartridge comprising:

a cartridge frame;

a photosensitive drum rotatably disposed at the cartridge frame; and a second coupler disposed at an end of the photosensitive drum, the second coupler comprising:
an inner circumference gradually decreasing from an outside to an inside of the second coupler and corresponding to the tapered portion and
a second sloping rib corresponding to the first sloping rib, the first coupler being inserted into the second coupler as the first coupler is rotated, and a rotation force of the driving motor being transferred to the first coupler and the second coupler as the driving motor is rotated.

5. The development cartridge according to claim 4, wherein:

the first sloping rib comprises a plurality of sloping grooves formed at the outer circumference of the tapered portion and spaced at a predetermined interval, and the second sloping rib comprises a plurality of spiral protrusions protruded from the inner circumference of the second coupler in a spiral direction, spaced at the predetermined interval and corresponding to the sloping grooves.

6. An electrophotographic printer to form an image on a printing medium, the electrophotographic printer comprising:

a main body;

a development cartridge removably disposed at the main body;

a driving motor;

a rotation unit rotated by a rotation force transferred from the driving motor;

a first coupler movably supported at the rotation unit and having a spiral type first sloping rib; and a removable connecting and separating unit to connect and separate the development cartridge with and from the main body, the development cartridge comprising:
a photosensitive drum,
a development unit to develop the image on the photosensitive drum, and
a second coupler comprising a second sloping rib spirally formed at an inner circumference of the second coupler and corresponding to the first sloping rib, the first and second sloping ribs being coupled by being rotated relative to each other, and the rotation force of the driving motor being transferred from the rotation unit to the photosensitive drum according to the coupling of the first and second sloping ribs.

7. The electrophotographic printer according to claim 6, further comprising:

a support bracket disposed at the main body to rotatably support the rotation unit;

a connection unit to move the first coupler to connect the first coupler with the second coupler; and a separation unit to separate the connected first and second couplers to install and separate the development cartridge to and from the main body.

8. The electrophotographic printer according to claim 7, wherein the connection unit comprises a pressure spring disposed at the rotation unit to press the first coupler in a direction of the development cartridge.

9. A coupling apparatus comprising:

a first coupler comprising a first sloping rib; and a second coupler connected to the first coupler in a connected state, comprising a second sloping rib corresponding to the first sloping rib, the first and second couplers being rotated together about coinciding axes.

10. The coupling apparatus according to claim 9, wherein the first and second sloping ribs are completely connected in the connected state.

11. The coupling apparatus according to claim 9, wherein the first and second sloping ribs are connected by rotating the first and second couplers relative to each other in a separated state.

12. A development cartridge removably disposed in an electrophotographic printer, the electrophotographic printer comprising a first coupler comprising a first sloping rib at an outer circumference thereof, the development cartridge comprising:

a second coupler comprising a second sloping rib at an inner circumference thereof corresponding to the first sloping rib, the first and second sloping ribs being completely connected in a connected state.

13. The development cartridge according to claim 12, wherein the first and second couplers are connected by inserting the first coupler into the second coupler and rotating the first and second couplers relative to each other.

14. The development cartridge according to claim 12, wherein the development cartridge further comprises a photosensitive drum, and the second coupler is disposed at an end of the photosensitive drum.

15. The development cartridge according to claim 12, wherein:

the first sloping rib is formed on a first tapered portion of the first coupler, and the second sloping rib is formed on a second tapered portion of the second coupler, the first tapered portion of the first coupler corresponding to the second tapered portion of the second coupler.

16. An electrophotographic printer to form an image on a printing medium, the electrophotographic printer comprising:

a driving motor;

a rotation unit rotated by a rotation force transferred from the driving motor;

a first coupler movably supported at the rotation unit and having a first sloping rib;

a second coupler to receive the rotation force from the first coupler, the second coupler comprising a second sloping rib corresponding to the first sloping rib; and a photosensitive drum rotated by the second coupler.

17. The electrophotographic printer according to claim 16, further comprising:

a door; and an interference lever drivedly connected with the door, wherein the interference lever Interferes with the first coupler to push the first coupler away from the second coupler in an open door state.

18. The electrophotographic printer according to claim 17, wherein:

the interference lever comprises:
a first portion having a first width,
a second portion having a second width, wider than the first width, and
a sloping portion to connect the first and second portions; and the first coupler comprises a flange portion, wherein
the sloping portion contacts the flange portion in the open door state to thereby push the first coupler away from the second coupler.

19. The electrophotographic printer according to claim 18, further comprising:

a pressing spring to push the first coupler towards the second coupler in a closed door state.

20. The electrophotographic printer according to claim 16, wherein rotation speeds of the first and second couplers are equal.

21. The electrophotographic printer according to claim 16, wherein a rotation speed of the photosensitive drum is constant.

22. The electrophotographic printer according to claim 18, wherein a width of the first sloping rib decreases in a direction of the flange portion.

23. A method of transferring a rotation force in an electrophotographic printer comprising a first coupler having a first sloping rib and a second coupler having a second sloping rib corresponding to the first sloping rib, the method comprising:

inserting the first rib into the second rib;
connecting the first and second couplers completely, comprising rotating the first rib relative to the second rib;
rotating the first rib about a rotation axis; and
rotating the second rib about the rotation axis.

* * * * *